(12) United States Patent
Prociw

(10) Patent No.: US 9,644,844 B2
(45) Date of Patent: May 9, 2017

(54) MULTIPOINT FUEL INJECTION ARRANGEMENTS

(71) Applicant: Delavan Inc, West Des Moines, IA (US)

(72) Inventor: Lev Alexander Prociw, Johston, IA (US)

(73) Assignee: Delavan Inc., West Des Moines, IA (US)

( * ) Notice: Subject to any disclaimer, the term of this patent is extended or adjusted under 35 U.S.C. 154(b) by 261 days.

(21) Appl. No.: 13/664,795

(22) Filed: Oct. 31, 2012

(65) Prior Publication Data

US 2014/0075949 A1 Mar. 20, 2014

Related U.S. Application Data

(60) Provisional application No. 61/555,363, filed on Nov. 3, 2011.

(51) Int. Cl.
*F23R 3/28* (2006.01)
*F23R 3/34* (2006.01)

(52) U.S. Cl.
CPC ............... *F23R 3/28* (2013.01); *F23R 3/346* (2013.01); *F23C 2201/20* (2013.01)

(58) Field of Classification Search
CPC .... F23R 3/28; F23R 3/286; F23R 3/20; F23R 3/34; F23R 3/50; F23R 3/12; F23R 3/246; F23R 3/283; F23R 3/40; F02C 7/222; F23D 14/04; F23D 14/10; F23D 11/107; F23D 11/24; F23D 2900/11101; F23D 2211/00; A01C 15/006; A47L 15/16; A47L 15/241; F23C 2201/20; B05B 1/14; B05B 1/3426; B05B 1/3431; B05B 1/3436; B65D 82/20

USPC .................. 60/739, 740, 742, 746, 747
See application file for complete search history.

(56) References Cited

U.S. PATENT DOCUMENTS

| | | | |
|---|---|---|---|
| 2,607,193 A | 8/1952 | Berggren et al. | |
| 3,680,793 A | 8/1972 | Tate et al. | |
| 3,937,011 A | 2/1976 | Caruel et al. | |
| 3,943,705 A * | 3/1976 | DeCorso et al. | ............... 60/723 |
| 3,980,233 A | 9/1976 | Simmons et al. | |
| 4,073,134 A * | 2/1978 | Koch | ........................... 60/39.23 |
| 4,598,553 A | 7/1986 | Saito et al. | |
| 5,409,169 A | 4/1995 | Saikalis et al. | |

(Continued)

FOREIGN PATENT DOCUMENTS

| JP | 2005061715 A | 3/2005 |
|---|---|---|
| WO | WO-2014204449 A1 | 12/2014 |

OTHER PUBLICATIONS

R. Tacina et al. "Experimental Investigation of a Multiplex Fuel Injector Module With Discrete Jet Swirlers for Low Emission Combustors," NASA/TM-2004-212918; AIAA-2004-0185 (2004).

(Continued)

*Primary Examiner* — Ehud Gartenberg
*Assistant Examiner* — Jared W Pike
(74) *Attorney, Agent, or Firm* — Locke Lord LLP

(57) ABSTRACT

A multipoint fuel injection system includes a plurality of fuel manifolds. Each manifold is in fluid communication with a plurality of injectors arranged circumferentially about a longitudinal axis for multipoint fuel injection. The injectors of separate respective manifolds are spaced radially apart from one another for separate radial staging of fuel flow to each respective manifold.

14 Claims, 3 Drawing Sheets

(56) References Cited

U.S. PATENT DOCUMENTS

| | | | |
|---|---|---|---|
| 5,713,206 | A | 2/1998 | McWhirter et al. |
| 6,092,363 | A | 7/2000 | Ryan |
| 6,360,525 | B1 | 3/2002 | Senior et al. |
| 6,363,726 | B1 | 4/2002 | Durbin et al. |
| 6,533,954 | B2 | 3/2003 | Mansour et al. |
| 6,688,534 | B2 | 2/2004 | Bretz |
| 6,755,024 | B1 | 6/2004 | Mao et al. |
| 6,854,670 | B2 | 2/2005 | Sumisha et al. |
| 6,863,228 | B2 | 3/2005 | Mao et al. |
| 7,454,914 | B2 | 11/2008 | Prociw |
| 7,509,811 | B2 | 3/2009 | Chen et al. |
| 7,520,134 | B2 | 4/2009 | Durbin et al. |
| 7,533,531 | B2 | 5/2009 | Prociw et al. |
| 7,926,178 | B2 | 4/2011 | Thomson et al. |
| 7,926,282 | B2 | 4/2011 | Chew et al. |
| 8,015,796 | B2 | 9/2011 | Babu et al. |
| 8,171,735 | B2 | 5/2012 | Mancini et al. |
| 2002/0134084 | A1 | 9/2002 | Mansour et al. |
| 2009/0255258 | A1 | 10/2009 | Bretz et al. |
| 2011/0031333 | A1 | 2/2011 | Short |

OTHER PUBLICATIONS

C. Lee et al., "High Pressure Low Nox Emissions Research: Recent Progress at NASA Glenn Research Center," ISABE-2007-1270 (2007).
K. M. Tacina et al. "NASA Glenn High Pressure Low NOX Emissions Research," NASA/TM-2008-214974 (2008).
International Search Report for PCT Application No. PCT/US2013/048201, dated Sep. 25, 2013.

\* cited by examiner

MULTIPOINT FUEL INJECTION ARRANGEMENTS

CROSS-REFERENCE TO RELATED APPLICATIONS

This application claims priority to U.S. Provisional Patent Application No. 61/555,363 filed Nov. 3, 2011 which is incorporated by reference herein in its entirety.

STATEMENT REGARDING FEDERALLY SPONSORED RESEARCH OR DEVELOPMENT

This invention was made with government support under contract number NNC11CA15C awarded by NASA. The government has certain rights in the invention.

BACKGROUND OF THE INVENTION

1. Field of the Invention

The present invention relates to multipoint injection, and more particularly to multipoint fuel injection such as in gas turbine engines.

2. Description of Related Art

NASA's "Environmentally Responsible Aircraft" (ERA) N+2 advanced, low NOx combustor technologies program is looking at combustion technologies suitable for the 2020 time frame. The objective of this program is to develop fuel-air mixing concepts and associated fuel control valves. The low emissions combustor concept must be capable of meeting or exceeding the N+2 LTO NOx goal of 75% reduction from the ICAO standard adopted by CAEP 6 at engine pressure ratios of at least 55.

In the early 2000's, the ability of a multipoint lean direct injection (LDI) concept was demonstrated to achieve very low NOx emissions index (EI) levels as tested at the NASA high pressure test facilities. The program was successful in demonstrating the ability of the multipoint concept to deal with NOx at high power conditions but was not optimized to perform equally as well at low power conditions such as start, ground idle, and flight idle conditions.

Conventional methods and systems have generally been considered satisfactory for their intended purpose. However, there is still an need in the art for a multipoint fuel injection arrangement that allows for improved performance at high and low power operation while significantly reducing NOx emissions. There also remains a need in the art for such a multipoint fuel injection arrangement that is easy to make and use. The present invention provides a solution for these problems.

SUMMARY OF THE INVENTION

The subject invention is directed to a new and useful multipoint fuel injection system. The system includes a plurality of fuel manifolds. Each manifold is in fluid communication with a plurality of injectors arranged circumferentially about a longitudinal axis for multipoint fuel injection in an annular combustor. The injectors of separate respective manifolds are spaced radially apart from one another for separate radial staging of fuel flow to each respective manifold.

In accordance with certain embodiments, each manifold includes a conduit extending circumferentially around a combustor, and the injectors in fluid communication with each manifold are spaced apart circumferentially from one another. It is also contemplated that in certain embodiments a plurality of feed arms are provided for fluid communication between the manifolds and the injectors, wherein each feed arm forms an injector tree with at least one injector mounted thereto corresponding to each manifold, and wherein each feed arm includes fuel conduits connected to provide fluid communication between respective manifolds and injectors. The injectors of each of the manifolds can be circumferentially staggered from radially adjacent injectors of other manifolds, or can be radially aligned.

In certain embodiments, a combustor having an annular upstream wall is included. An outboard wall extends downstream from the upstream wall, and an inboard wall extends downstream from the upstream wall, opposed to the outboard wall. The inboard and outboard walls define a combustor outlet configured to deliver combustion products to a downstream turbine. The injectors are mounted to the upstream wall with the manifolds outside the combustor. It is contemplated that the injectors and combustor can be configured so that about 85% of total air flow through the combustor is supplied through the injectors. It is also contemplated that the inboard and outboard walls of the combustor can converge towards one another in a downstream direction from the injectors, wherein at least some of the injectors are oriented oblique to the longitudinal axis to reduce flame impingement on the inboard and outboard walls of the combustor. There can be about 250 injectors, for example.

In certain embodiments, there are five manifolds each in fluid communication with a plurality of respective injectors arranged circumferentially about the longitudinal axis. The injectors of a first one of the manifolds are an inboard set of injectors. The injectors of a second one of the manifolds are an inner intermediate set of injectors outboard of the inboard set. The injectors of a third one of the manifolds are a middle set of injectors outboard of the inner intermediate set. The injectors of a fourth one of the manifolds are an outer intermediate set of injectors outboard of the middle set, and the injectors of a fifth one of the manifolds are an outboard set of injectors outboard of the outer intermediate set.

The injectors of the outboard and outer intermediate sets of injectors can be angled inward toward the respective centerlines defined by the middle set of injectors, and the injectors of the outboard set of injectors can be more angled than are those of the outer intermediate set. Similarly, the injectors of the inboard and inner intermediate sets of injectors can be angled outward relative to the respective centerlines, and the injectors of the inboard set of injectors can be more angled than are those of the inner intermediate set. The injectors of the middle set of injectors can be aligned along respective centerlines defined from the injectors in the middle set of injectors toward the center of the combustor outlet downstream of the middle set of injectors.

Each injector of the inboard, outboard, inner intermediate, and outer intermediate sets of injectors can be an airblast injector that includes an inner air swirler defining an interior flow passage configured and adapted for fluid communication of compressor discharge air through the interior flow passage such that swirl is imparted on air flow through the interior flow passage. An outer air cap is mounted outboard of the inner air swirler with a fuel passage defined between the inner air swirler and the outer air cap. The fuel passage includes a discharge outlet between downstream portions of the inner air swirler and outer air cap for issuing fuel for combustion. The outer air cap defines an outer air circuit configured for substantially swirl-free injection of compressor discharge air outboard of the fuel passage.

Each injector of the middle set of injectors can be an air assist pressure atomizer that includes a central pressure atomizer surrounded by a nozzle body having a plurality of cylindrical bores defined therethrough configured and adapted for imparting swirl on a flow of air flowing through the nozzle body.

In certain embodiments, the inboard and outboard sets of injectors are each configured to supply about 20% of the combustion air flow into the combustor. The inner and outer intermediate sets of injectors can each be configured to supply about 25% of the combustion air flow into the combustor, and the middle set of injectors can be configured to supply about 10% of the combustion air flow into the combustor.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
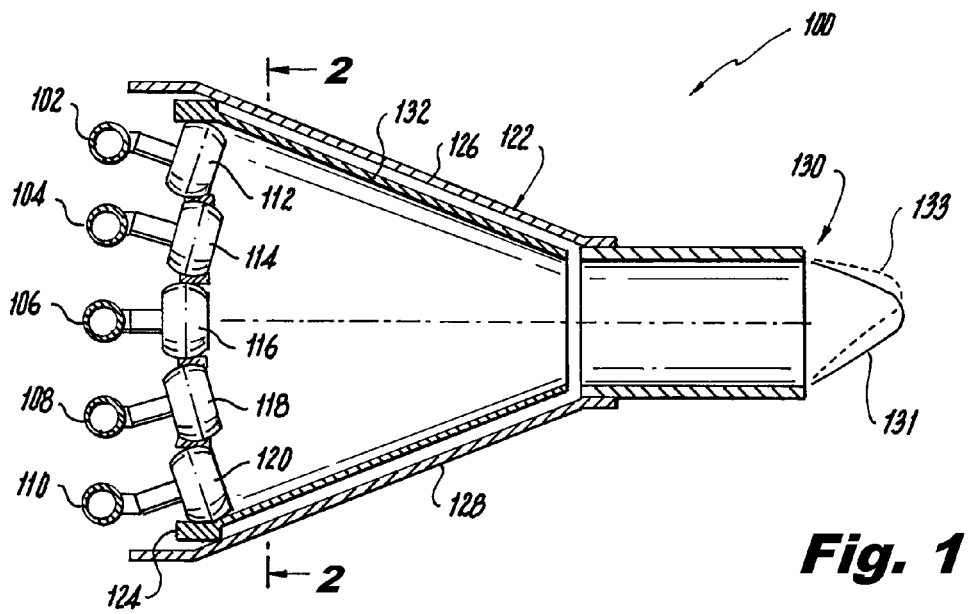
FIG. 1 is a schematic cross-sectional view of an exemplary embodiment of a multipoint fuel injection system constructed in accordance with the present invention, showing five separately staged manifolds and respective injectors.

Reference will now be made to the drawings wherein like reference numerals identify similar structural features or aspects of the subject invention. For purposes of explanation and illustration, and not limitation, a partial view of an exemplary embodiment of a multipoint fuel injection system in accordance with the invention is shown in FIG. 1 and is designated generally by reference character 100. Other embodiments of multipoint fuel injection systems in accordance with the invention, or aspects thereof, are provided in FIGS. 2-5, as will be described. The systems of the invention can be used to reduce $NO_X$ emissions index ($EINO_X$) in gas turbine engines, for example.

Multipoint refers to the use of a large number of small mixers to introduce the fuel and air into the combustor from a plane at the dome. Lean direct injection implies nearly all the air that enters the combustor does so through the fuel/air mixers. No additional air holes as might be used in conventional combustors are required. The basic multipoint premise of injecting fuel through a large number of injection sites promotes rapid mixing. The benefit gained by the use of very small mixers can be explained as follows. Reduction of the individual flows reduces the diameter of the nozzle, or mixer, diameter. The volume of recirculation zone downstream of the mixer is thought to be a controlling parameter for the quantity of NOx produced in a typical combustor. If the recirculation volume is proportional to the cube of the diameter of the mixer, and if the $NO_X$ produced is proportional to the recirculation volume, and the fuel flow is taken to be proportional to the square of the diameter of the mixer, then a larger nozzle will produce greater fuel flow, but also a greater emission index of $NO_X$ ($EINO_X$). For example, a nozzle with a diameter of 3 units will produce approximately 3 times the $EINO_X$ of 9 nozzles, each with a diameter of 1 unit, at the same temperature and pressure and same total fuel and air flow.

In the systems described herein, there is a much reduced number of nozzles is possible compared to traditional multipoint systems, e.g., 250 nozzles instead of 1000-1200. In system 100, nozzles are arranged in a staggered array pattern and are manifolded in radial stages. The radial stages can be utilized to control radial temperature distribution to the turbine. Radial staging is also used to maintain adequate temperature levels around specific nozzles at low power conditions to provide adequate emissions and stability at these conditions. In addition to the modifications of the general arrangement, injector design features in accordance with the invention can be optimized by stage such that much higher air fuel mixing rates with lower central recirculation zones dominate high power conditions while more conventional swirl stabilization dominates at low power conditions when inlet temperatures are low.

Referring now to FIG. 1, system 100 includes five separate fuel manifolds 102, 104, 106, 108, and 110. Each manifold 102, 104, 106, 108, and 110 is in fluid communication with a separate plurality of injectors 112, 114, 116, 118, and 120, respectively. The injectors 120 of manifold 110 are an inboard set of injectors. The injectors 118 of manifold 108 are an inner intermediate set of injectors outboard of the inboard set. The injectors 116 of manifold 106 are a middle set of injectors outboard of the inner intermediate set. The injectors 114 of manifold 104 are an outer intermediate set of injectors outboard of the middle set, and the injectors 112 of manifold 102 are an outboard set of injectors outboard of the outer intermediate set. There can be about 50 injectors per manifold, for a total of about 250 injectors in system 100. Each injector can be on the scale of about one inch in diameter, for example. Those skilled in the art will readily appreciate that these numbers and dimensions for injectors and manifolds are exemplary, and that any suitable sizes or number of manifolds and injectors can be used for a given application without departing from the scope of the invention.

Figure 4:
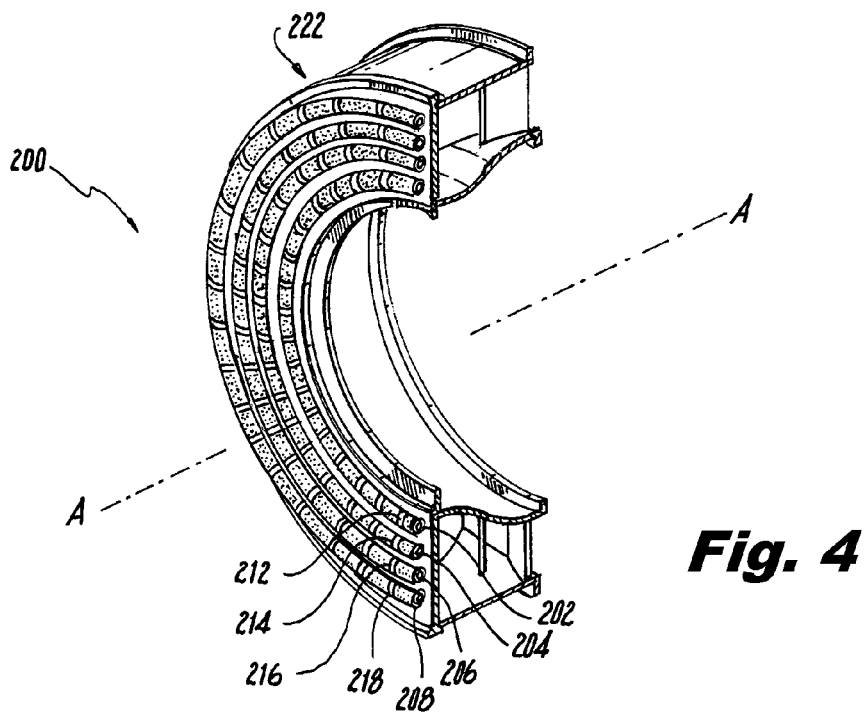
FIG. 4 is a cross-sectional perspective view of another exemplary embodiment of a multipoint fuel injection system constructed in accordance with the present invention, showing four separately staged manifolds and respective injectors.

Each set of injectors 112, 114, 116, 118, and 120 is arranged circumferentially about a longitudinal axis A for multipoint fuel injection in an annular combustor 122 (longitudinal axis A is not shown in FIG. 1, however see FIG. 4). The injectors 112, 114, 116, 118, and 120 of separate respective manifolds 102, 104, 106, 108, and 110 are spaced radially apart from one another for separate radial staging of fuel flow to each respective manifold.

System 100 includes a combustor 122 having an annular upstream wall 124 or dome. An outboard wall 126 extends downstream from upstream wall 124, and an inboard wall 128 extends downstream from upstream wall 124, opposed to outboard wall 126. The inboard and outboard walls 126 and 128 define a combustor outlet 130 configured to deliver combustion products to a downstream turbine. The injectors 112, 114, 116, 118, and 120 are mounted to upstream wall 124 with the manifolds 102, 104, 106, 108, and 110 located outside of combustor 122. Injectors 112, 114, 116, 118, and 120 and combustor 122 are configured so that about 85% of total air flow through combustor 122 is supplied through the injectors. The remaining 15% of the total air flow is used to cool the outboard and inboard walls 126 and 128, venting between shield walls 132, e.g., ceramic lined, and the exterior portions of the outboard and inboard walls 126 and 128. Outboard and inboard walls 126 and 128 converge towards one another in a downstream direction from the injectors 112, 114, 116, 118, and 120. The 85% figure provided above is exemplary for the context of very lean combustion operation, however the invention can be practiced in configurations with other percentages of compressor discharge air passing through the injectors, for example from about 20% to 100%.

The injectors 116 of the middle set of injectors are aligned in parallel with longitudinal axis A. Injectors 112, 114, 118, and 120 are oriented oblique to longitudinal axis A to reduce flame impingement on the outboard and inboard walls 126 and 128. In particular, injectors 112 and 114 of the outboard and outer intermediate sets of injectors are angled inward toward the centerline downstream of the injectors. The injectors 112 of the outboard set of injectors are optionally more angled, i.e., angled steeper, relative to longitudinal axis A than are injectors 114 of the outer intermediate set. Similarly, the injectors 120 and 118 of the inboard and inner intermediate sets of injectors are angled outward relative to longitudinal axis A downstream of the injectors, and the injectors 120 of the inboard set of injectors are more angled relative to longitudinal axis A than are injectors 118 of the inner intermediate set.

Selection of the angles of the various rows of injectors as described above is advantageous as it avoids impinging any given nozzle flow on to the wall of the combustor. The wall angles are usually determined by the dome height and the exit height. The dome height is dimensioned so as to accommodate all of the nozzles. The exit height is smaller and is defined by the turbine requirement. The central row of injectors 116 is aimed approximately at the radial center line of the exit plane of combustor 122. The inner and outer rows, injectors 120 and 112, are aimed to flow approximately parallel to the adjacent walls 126 and 128. The intermediate jets of injectors 114 and 118 are aimed on angles between those of the respective adjacent rows of injectors.

Although FIG. 1 shows an exemplary embodiment wherein the dome and exit of combustor 122 are centered, i.e., along the dashed center line in FIG. 1, a more general case of nozzle angles used to avoid combustor wall impingement can be described as follows. If the centerlines of the injectors are extended downstream, there will be a location of the theoretical intersection point of the center lines. In FIG. 1, this point is located outside of the combustor, i.e., to the right of the end of shield walls 132, however it could be at or inside the combustor exit without departing from the scope of the invention. In applications where the combustor dome and exit are not centered radially, the same general angles described above can be used for the various rows of injectors, namely any row on the center of the dome can be angled toward the center of the combustor exit, any rows on the inner and outer periphery can be angled parallel to the respective combustor walls, and any intermediate rows can be angled proportionally to their radial neighbors.

Figure 3:
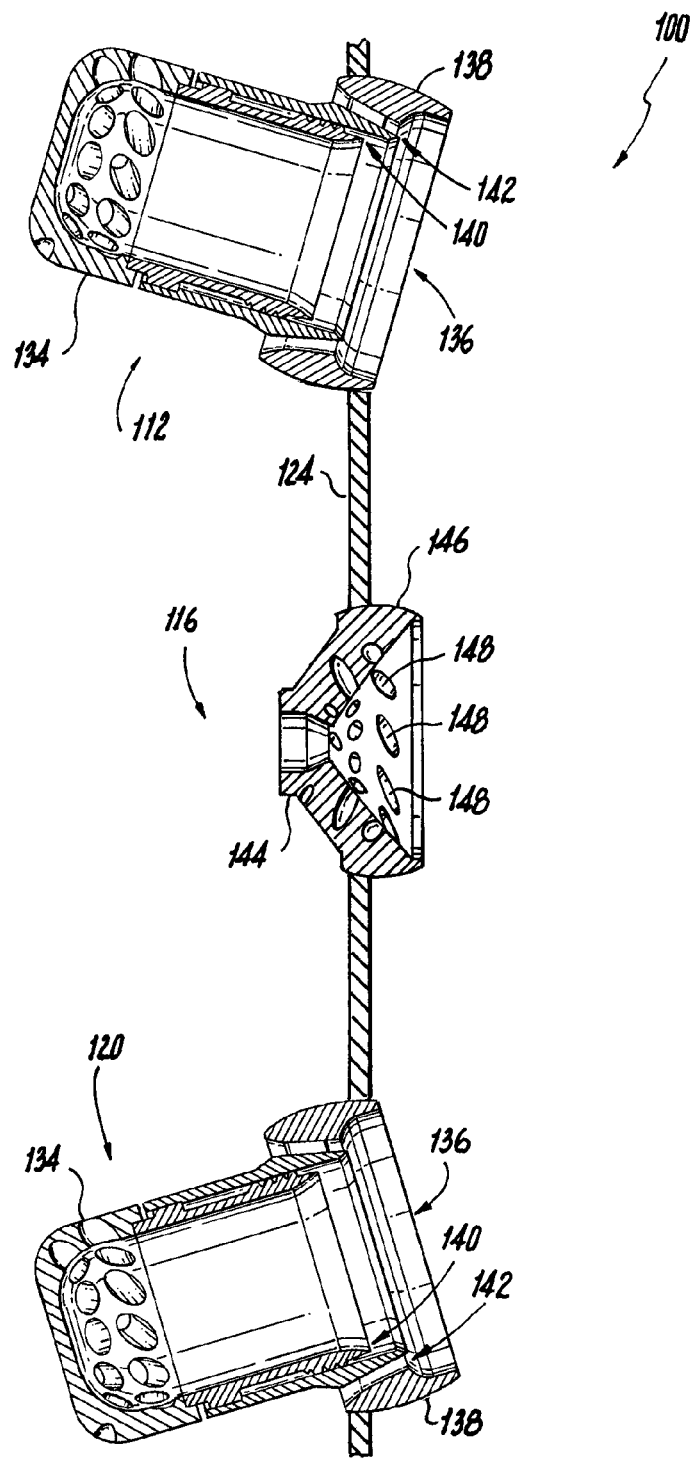
FIG. 3 is a cross-sectional side elevation view of the injectors and combustor of FIG. 2, showing the airblast and air assist nozzles.

It should be kept in mind that the injectors 112, 114, 116, 118, and 120 have a staggered formation, so the five injectors as shown in FIG. 1 are depicted schematically and the intersection point of their respective centerlines is conceptual. In the actual staggered configuration, all five injectors do not lie on the same radial line. However, three injectors 112, 116, and 120 can lie on a common radius as shown in FIG. 3. The angles of intermediate injectors 114 and 118 can be determined by setting the respective intersections of their respective centerline at the same downstream distance and radius as the intersections of the centerlines of respective injectors 112, 116, and 120.

At low power, the manifold 106 is dominant as a central pilot, using conventional high swirl nozzle for flame stability. The combustor 122 operates similar to a rich-quench lean system with a diffusion flame in the core. Adjacent, unfueled injectors 112, 114, 118, and 120 act as dilution holes. At higher power, inlet air temperatures are very high and as such, combustor 122 can run lean. The recirculation for stability is not as important. Fuel concentration is shifted to low swirl injectors 112, 114, 118, and 120 at the outer manifold locations. By staging the various manifolds, different temperature profiles can be achieved at the outlet of combustor 122. Two such examples of temperature profiles 131 and 133 are shown schematically in FIG. 1. Profile 131 is exemplary of outlet temperatures for staging the manifolds with manifold 106 dominate, as in pilot mode. This creates a centered temperature peak at the outlet. Profile 133 is exemplary of outlet temperatures for staging on all five manifolds in lean operation, and the temperature profile at this stage can be configured to suit the turbine. Those skilled in the art will readily appreciate that these temperature profiles are exemplary, and that any other suitable temperature profiles can be staged for a given application without departing from the scope of the invention.

Figure 2:
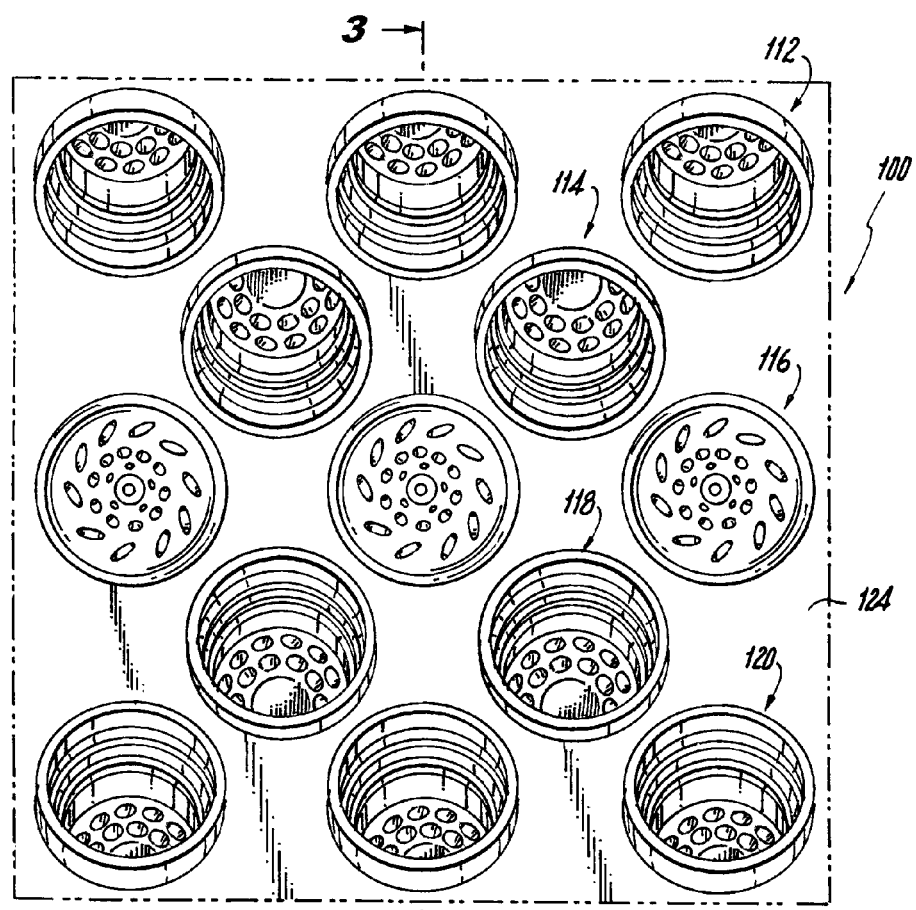
FIG. 2 is an interior elevation view of a portion of the system of FIG. 1, showing the pattern of injectors mounted in the upstream combustor wall.

With reference now to FIG. 2, the injectors 112, 114, 116, 118, and 120 of each of the manifolds 102, 104, 106, 108, and 110 are circumferentially staggered from radially adjacent injectors of other manifolds. For example, the injectors 118 of the inner intermediate set are staggered circumferentially relative the injectors 120 of the inner set, and so forth. Nozzles can be also be radially aligned, as shown in FIG. 4, for example to simplify manufacturing. In FIG. 2 the nozzles are advantageously staggered to reduce the height of the dome and to permit an increased spacing between nozzles which is advantageous for adequate thermal growth. Staggering reduces the number of nozzles required circumferentially to produce a uniform temperature pattern while maintaining a definite number of radial manifolds to control the shape of the radial temperature profile.

Referring now to FIG. 3, each injector 112, 114, 118, and 120 of the inboard, outboard, inner intermediate, and outer intermediate sets of injectors is an airblast injector that includes an inner air swirler 134 defining an interior flow passage 136 configured and adapted for fluid communication of compressor discharge air through the interior flow passage 136 such that swirl is imparted on air flow through the interior flow passage 136. An outer air cap 138 is mounted outboard of the inner air swirler 134 with a fuel passage 140 defined between inner air swirler 134 and outer air cap 138. Fuel passage 140 includes a discharge outlet between downstream portions of the inner air swirler 134 and outer air cap 138 for issuing fuel for combustion. Outer air cap 138 defines an outer air circuit 142 configured for substantially swirl-free injection of compressor discharge air outboard of fuel passage 140. In short, the airblast injectors 112, 114, 118, and 120 issue a swirling air core inside a fuel spray, which is inside a non-swirling flow of air.

The non-swirling flow converges in the downstream direction and may therefore be considered to have negative swirl in the sense that it forces the inner swirling air to converge, thereby intensifying the swirl in the inner air core and enhancing the atomization of the fuel spray. Moreover, due to the fact that adjacent injectors have non-swirling outer air flows adjacent to one another, there is a cooperation in the outer airflows of neighboring injectors, unlike the deleterious effects co- or counter-rotating swirl would have in the outer air circuits of adjacent injectors. Due to the non-swirling outer air flow of the outer air circuits, the airblast injectors 112, 114, 118, and 120 are more efficiently utilized than if there were swirl in the outer air flow as in traditional airblast fuel injection. Due to the injectors being arranged in close arrays, a flow pattern that tends to mix local fuel and air in a segregated manner, independent from adjacent injectors is advantageous.

Radial positions being staggered circumferentially and having the injectors tilted as described above to flow towards the center of the combustor creates secondary flow patterns that are utilized for combustion control particularly at low power conditions. Near the dome, spacing between the injectors is large enough to allow hot gas to flow between the injectors and help with ignition and combustion stability. Heat developed by the pilot injectors 116 flows between spaces outwardly to the outboard and inboard walls 126 and 128. This allows a slightly larger spacing between injectors than traditional designs and thereby provides for adequate thermal expansion of the combustor structure as well as providing more time for mixing between fuel and air of individual injectors before the adjacent fields interact.

With continued reference to FIG. 3, the middle set of injectors 116 is different from the other sets described above. Injectors 116 are air assist pressure atomizing nozzles instead of airblast nozzles. Air assist atomizing injectors 116 do not have an inner air core. Instead, there is a pressure atomizer 144 for fuel along the centerline of each injector 116. The central pressure atomizer 144 is surrounded by a nozzle body 146 having a plurality of cylindrical swirl bores 148 defined therethrough, radially offset and angled for imparting swirl on a flow of air flowing through nozzle body 146. Swirling compressor discharge air issued from swirl bores 148 interacts with the fuel issued from pressure atomizer 144 to enhance atomization. It is also contemplated that airblast injectors could be used in lieu of air assist injectors 116, however, the pilot injectors should utilize higher swirl than the other injector rows in order to distribute heat outwardly to the adjacent aerated nozzles and thereby allow strong, thermal communication between adjacent pilots at low power conditions.

Each of the injectors described above has an air swirler, including the airblast injectors that have non-swirling outer air circuits. It is advantageous for the nozzles to all have air and fuel flows that are co-swirling in direction. This results in the mutual annihilation of most residual swirl before the flow enters the turbine section where residual swirl is typically detrimental and not desired. Those skilled in the art will appreciate that counter-swirling configurations can be used, if suitable for particular applications, without departing from the scope of the invention.

Referring to FIGS. 2 and 3, the outboard and inboard sets of injectors 112 and 120 are each configured to supply about 20% of the combustion air flow into combustor 122. The inner and outer intermediate sets of injectors 118 and 114 are each configured to supply about 25% of the combustion air flow into the combustor. The middle set of injectors 116 is configured to supply about 10% of the combustion air flow into the combustor. These percentages provide advantageous control of the interior gas path. The percentages above account for the combustion air flow, which does not include the cooling air flow described above for thermal management of combustor wall temperatures.

With reference now to FIG. 4, another exemplary embodiment of a multipoint fuel injection system 200 has four manifolds 202, 204, 206, and 208, each with a respective set of injectors. Each manifold includes a conduit, in FIG. 4 shown as a flexible hose, but it could be an arcuate pipe, or the like, extending circumferentially around the combustor 222. The injectors in fluid communication with each manifold 212, 214, 216, and 218 are spaced apart circumferentially from one another along their respective conduits as described above. Unlike the injectors of system 100 described above with reference to FIG. 2, the injectors of system 200 shown in FIG. 4 are not circumferentially staggered, but are radially aligned with their nearest neighbors of adjacent manifolds.

Figure 5:
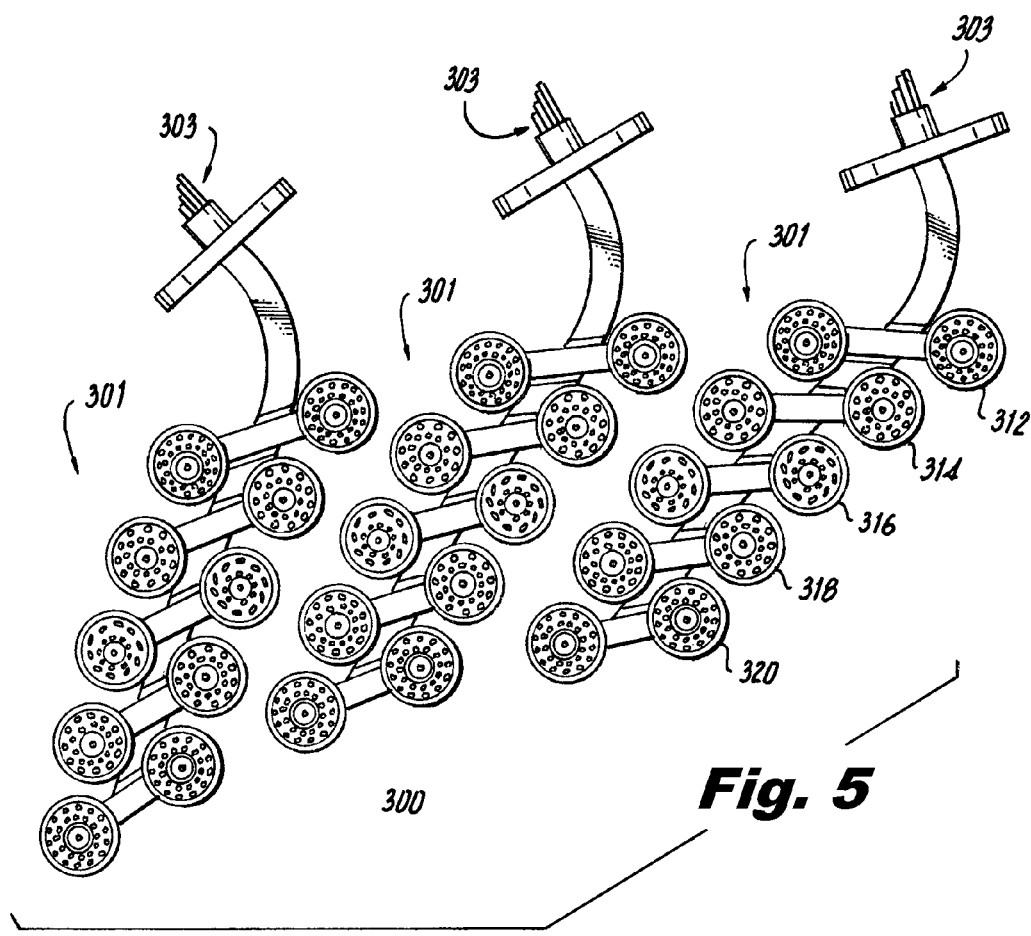
FIG. 5 is a schematic perspective view of a portion of another exemplary embodiment of a multipoint fuel injection system constructed in accordance with the present invention, showing feed arms, each including ten multipoint injection nozzles.

Referring now to FIG. 5, another exemplary embodiment of a multipoint fuel injection system 300 includes a plurality of feed arms 301 that provide for fluid communication between five manifolds and the injectors 312, 314, 316, 318, and 320. The five manifolds are not shown in FIG. 5, but see, e.g., the manifolds shown in FIGS. 1 and 4. Each feed arm 301 includes ten injectors mounted thereto, two injectors corresponding to each manifold to form an injector tree. Each feed arm includes five separate fuel conduits 303 to provide separate connections for fluid communication between respective manifolds and injectors. When mounted in a combustor, the injectors of feed arms 301 can be arranged in the same staggered array as described above.

The methods and systems of the present invention, as described above and shown in the drawings, provide for multipoint injection with superior properties including reduced $NO_X$ emissions index ($EINO_X$). While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A multipoint fuel injection system comprising:
a plurality of fuel manifolds, wherein each manifold is in fluid communication with a plurality of injectors arranged circumferentially about a longitudinal axis in an annular array for multipoint fuel injection in an annular combustor, wherein the injectors of separate respective manifolds are spaced radially apart from one another for separate radial staging of fuel flow to each respective manifold, wherein a middle set of the injectors are pilot injectors, wherein injectors inboard and outboard of the middle set of injectors are airblast injectors, wherein each injector defines a flow trajectory such that the flow trajectory of each set of radially adjacent injectors converges generally towards a respective point of convergence, wherein the points of convergence all generally lie on a circle,
wherein there are five manifolds each in fluid communication with a plurality of respective injectors arranged circumferentially about the longitudinal axis, wherein the injectors of a first one of the manifolds are an inboard set of injectors, wherein the injectors of a second one of the manifolds are an inner intermediate set of injectors outboard of the inboard set, wherein the injectors of a third one of the manifolds are a middle set of injectors outboard of the inner intermediate set, wherein the injectors of a fourth one of the manifolds are an outer intermediate set of injectors outboard of the middle set, and wherein the injectors of a fifth one of the manifolds are an outboard set of injectors outboard of the outer intermediate set, wherein each injector of the inboard set of injectors includes:
  an inner air swirler defining an interior flow passage configured and adapted for fluid communication of compressor discharge air through the interior flow passage such that swirl is imparted on air flow through the interior flow passage; and
  an outer air cap mounted outboard of the inner air swirler with a fuel passage defined between the inner air swirler and the outer air cap, the fuel passage including a discharge outlet between downstream portions of the inner air swirler and outer air cap for issuing fuel for combustion, wherein the outer air cap defines an outer air circuit configured for substantially swirl-free injection of compressor discharge air outboard of the fuel passage, wherein each injector of the inner intermediate set of injectors includes:
  an inner air swirler defining an interior flow passage configured and adapted for fluid communication of compressor discharge air through the interior flow passage such that swirl is imparted on air flow through the interior flow passage; and
  an outer air cap mounted outboard of the inner air swirler with a fuel passage defined between the inner air swirler and the outer air cap, the fuel passage including a discharge outlet between downstream portions of the inner air swirler and outer air cap for issuing fuel for combustion, wherein the outer air cap defines an outer air circuit configured for substantially swirl-free injection of compressor discharge air outboard of the fuel passage, wherein each injector of the outer intermediate set of injectors includes:
  an inner air swirler defining an interior flow passage configured and adapted for fluid communication of compressor discharge air through the interior flow passage such that swirl is imparted on air flow through the interior flow passage; and
    an outer air cap mounted outboard of the inner air swirler with a fuel passage defined between the inner air swirler and the outer air cap, the fuel passage including a discharge outlet between downstream portions of the inner air swirler and outer air cap for issuing fuel for combustion, wherein the outer air cap defines an outer air circuit configured for substantially swirl-free injection of compressor discharge air outboard of the fuel passage, wherein each injector of the outboard set of injectors includes:
  an inner air swirler defining an interior flow passage configured and adapted for fluid communication of compressor discharge air through the interior flow passage such that swirl is imparted on air flow through the interior flow passage; and
  an outer air cap mounted outboard of the inner air swirler with a fuel passage defined between the inner air swirler and the outer air cap, the fuel passage including a discharge outlet between downstream portions of the inner air swirler and outer air cap for issuing fuel for combustion, wherein the outer air cap defines an outer air circuit configured for substantially swirl-free injection of compressor discharge air outboard of the fuel passage.

2. A multipoint fuel injection system as recited in claim 1, where the injectors of each of the manifolds are circumferentially staggered from radially adjacent injectors of other manifolds.

3. A multipoint fuel injection system as recited in claim 1, further comprising a combustor having an annular upstream wall, an outboard wall extending downstream from the upstream wall, and an inboard wall extending downstream from the upstream wall and opposed to the outboard wall, the inboard and outboard walls defining a combustor outlet configured to deliver combustion products to a downstream turbine, wherein the injectors are mounted to the upstream wall with the manifolds outside the combustor.

4. A multipoint fuel injection system as recited in claim 3, wherein the injectors and combustor are configured so that about 85% of total air flow through the combustor is supplied through the injectors.

5. A multipoint fuel injection system as recited in claim 3, wherein the inboard and outboard walls of the combustor converge towards one another in a downstream direction from the injectors, and wherein at least some of the injectors are oriented oblique to the longitudinal axis to reduce flame impingement on the inboard and outboard walls of the combustor.

6. A multipoint fuel injection system as recited in claim 1, wherein the injectors of the outboard and outer intermediate sets of injectors are angled inward toward a respective centerline defined by the longitudinal axis.

7. A multipoint fuel injection system as recited in claim 1, wherein the injectors of the outboard set of injectors are more angled relative to the centerline than are those of the outer intermediate set.

8. A multipoint fuel injection system as recited in claim 1, wherein the injectors of the inboard and inner intermediate sets of injectors are angled outward relative to a respective centerline defined by the longitudinal axis.

9. A multipoint fuel injection system as recited in claim 8, wherein the injectors of the inboard set of injectors are more angled relative to the centerline than are those of the inner intermediate set.

10. A multipoint fuel injection system as recited in claim 1, wherein the injectors of the middle set of injectors are aligned along a respective centerline defined from the injectors in the middle set of injectors toward the center of a combustor outlet downstream of the middle set of injectors.

11. A multipoint fuel injection system as recited in claim 1, wherein each injector of the middle set of injectors that includes a central pressure atomizer surrounded by a nozzle body having a plurality of cylindrical bores defined therethrough configured and adapted for imparting swirl on a flow of air flowing through the nozzle body.

12. A multipoint fuel injection system as recited in claim 1, wherein the inboard and outboard sets of injectors are each configured to supply about 20% of the combustion air flow into the combustor, wherein the inner and outer intermediate sets of injectors are each configured to supply about 25% of the combustion air flow into the combustor, and wherein the middle set of injectors is configured to supply about 10% of the combustion air flow into the combustor.

13. A multipoint fuel injection system as recited in claim 1, wherein there are about 250 injectors.

14. A multipoint fuel injection system as recited in claim 1, wherein the middle set of injectors are pressure atomizing nozzles.

\* \* \* \* \*